April 11, 1950          N. C. OLMSTEAD          2,503,405
CONTROL AND INDICATOR APPARATUS FOR RECTIFIERS
Filed Dec. 21, 1946
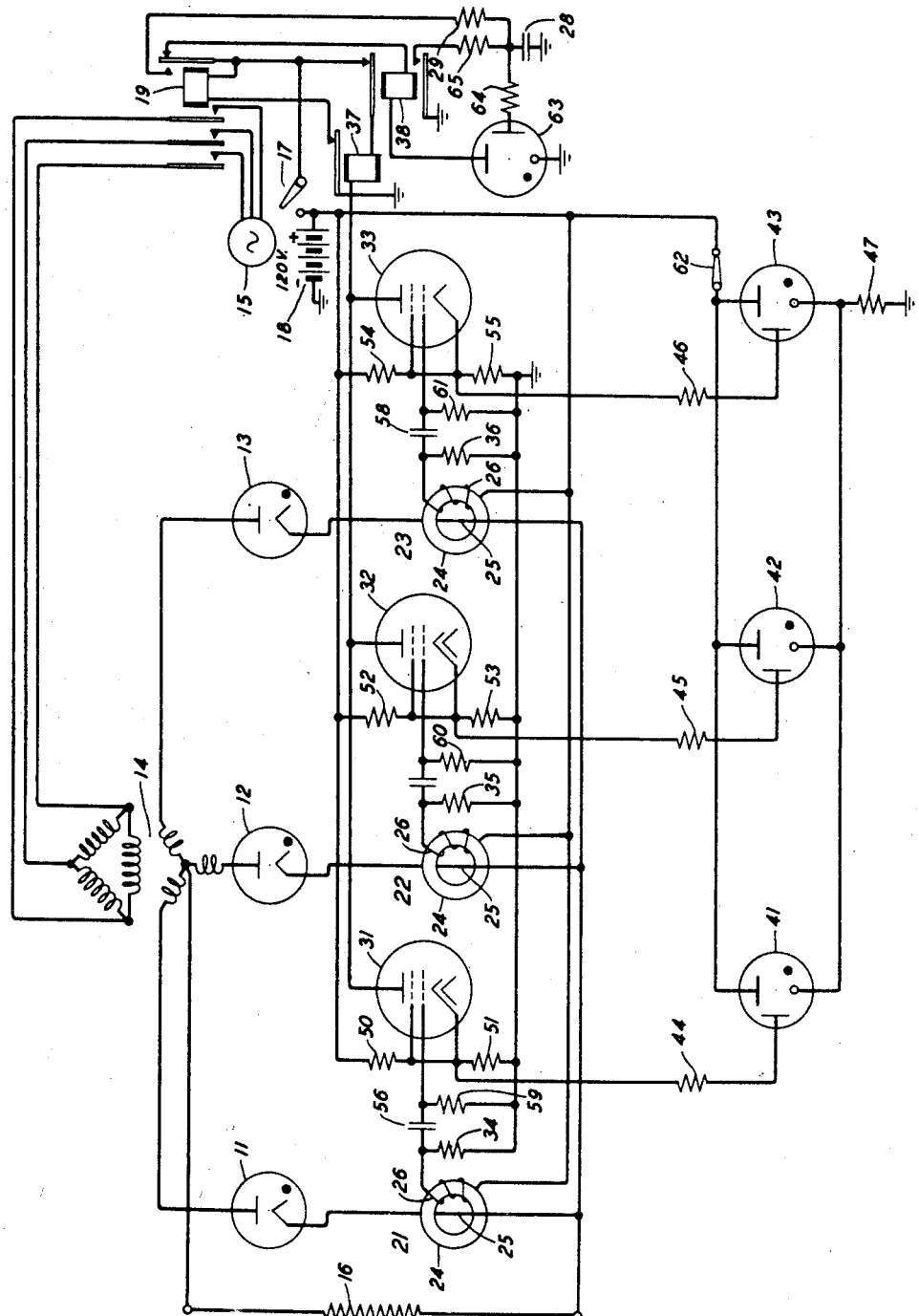
INVENTOR
N.C. OLMSTEAD
BY
G.F. Heuerman
ATTORNEY Patented Apr. 11, 1950

2,503,405

UNITED STATES PATENT OFFICE 2,503,405

CONTROL AND INDICATOR APPARATUS FOR RECTIFIERS

Noel C. Olmstead, Morristown, N. J., assignor to Bell Telephone Laboratories, Incorporated, New York, N. Y., a corporation of New York Application December 21, 1946, Serial No. 717,724

5 Claims. (Cl. 321—13)

This invention relates to electric control and indicating apparatus particularly for rectifiers. More specifically, the invention relates to apparatus for interrupting the energization of a rectifier when abnormal operation of the rectifier occurs and for identifying the rectifier element which caused the abnormal operation.

An object of the invention is to provide improved apparatus for controlling the energization of a rectifier.

Another object is to provide means for identifying the space current rectifying device of a plurality of such rectifying devices in which reverse current flow first occurs.

In a mercury vapor tube rectifier, a type of failure frequently encountered is known as "arc-back" or "back-fire." In this type of failure, one or more of the rectifier tubes conducts current in a direction which is reversed with respect to the direction of normal conduction through the tube. Such an arc-back in a rectifier tube may be caused by high tube temperature, age of the tube or by a high transient voltage across the tube electrodes. When an arc-back occurs in a certain rectifier tube, that tube and another tube conducting in a normal direction complete a short circuiting path across the current supply source. The resulting abnormally high current flowing in the space current path of the second tube will cause an increase in temperature of that tube so that it, in turn, will probably arc-back on the succeeding part of the power supply cycle when the polarity of the voltage across the tube electrodes is reversed.

In accordance with a specific embodiment of the invention herein shown and described for the purpose of illustration, there are provided a multiphase rectifier comprising a plurality of gas or vapor filled space current rectifying devices, a control circuit for controlling the supply of current to the rectifier and a plurality of indicator devices, one for each rectifying device, for identifying the rectifying device in which an arc-back first occurs. For controlling the energization of the control circuit and the selective energization of the indicator devices, there are employed a plurality of auxiliary space current devices, one for each rectifier device and means for generating control voltage pulses for controlling the auxiliary space current devices in response to the flow of reverse currents only through the rectifier devices, respectively.

The means for generating the control pulses comprises a plurality of transformers, one for each rectifier device, each having a saturable core, a primary through which flows the space current passing through the associated rectifier device, and a secondary across which the control voltage pulses are set up. An important feature of the invention is the provision of means for producing in each transformer core a unidirectional magnetomotive force for setting up a saturating flux in the core which magnetomotive force is in aiding relationship with respect to the magnetomotive force produced in the core due to the primary current flowing in the normal direction through the associated rectifying device. Specifically, this saturating flux is set up by a direct current supplied to the secondary of the transformer. If the core were unsaturated or if the core were saturated only by current flowing in the primary winding, a pulse of one polarity would be produced in the secondary when the normal current in the primary rises quickly from zero to full value at the start of a conduction period of a rectifier tube and a pulse of opposite polarity would be produced in the secondary when the primary current is interrupted at the end of each conduction period or when conduction in the reverse direction is started through a rectifier tube due to an arc-back. Under these conditions, therefore, an auxiliary pulse operated space current device would be unable to distinguish between pulses generated in response to the normal current flow through a rectifier tube and its transformer primary and a pulse generated due to current flowing in a reverse direction through a rectifier tube and its associated primary when an arc-back occurs in the rectifier tube. However, when the core is saturated independently of the current flowing in the primary of the transformer due to a magnetomotive force which aids the magnetomotive force set up by the normal primary current, no pulse or a pulse of negligibly small amplitude is produced in the secondary in response to the alternate starting and stopping of normal rectified current flowing in the primary and a current pulse of substantial magnitude is set up in the secondary only when a reverse current flows in the primary, that is, when an arc-back occurs in a rectifier tube, this reverse current setting up in the core a magnetomotive force which opposes the magnetomotive force which produces the saturating flux, thus causing the core to become unsaturated. This opposing magnetomotive force may be of the same order of magnitude or greater than the magnetomotive force which produces the saturating flux, for example, so that the resulting flux is reduced substantially to zero or reversed in direction when reverse current flows through the rectifier tube.

The invention will now be described in greater detail with reference to the accompanying drawing the single figure of which is a schematic view of a rectifier embodying the invention.

The drawing shows a three-phase high voltage rectifier comprising two electrode, mercury vapor filled rectifier tubes 11, 12 and 13, and a transformer 14, for rectifying current from a three-phase alternating current supply source 15, and for supplying the rectified current to a load 16. While a three-phase rectifier is shown in the drawing, a rectifier having any number of phases may obviously be employed. The rectifier is started in operation by closing the switch 17 which causes current from a direct current 120-volt source, shown as a grounded battery 18, to be supplied to the winding of a relay 19, thereby causing an energizing circuit to be completed from the current source 15 to the delta connected primary windings of transformer 14. Terminals of the secondary winding of transformer 14 are connected to the anodes of rectifier tubes 11, 12 and 13, respectively, and a common terminal of the secondary windings is connected to the negative load terminal. The cathodes of tubes 11, 12 and 13 are connected to the positive load terminal, suitable means, not shown, being provided for supplying heating currents to the cathodes. The operation of relay 19 also causes the completion of a circuit for charging a condenser 28 (8 microfarads) by current from source 18 through a circuit comprising a series resistor 29 (½ megohm).

There are provided three similar impulse transformers 21, 22 and 23, each comprising a toroidal core 24 preferably of Permalloy ribbon or other magnetic material having a high permeability at low magnetizing forces and which is easily saturated, a single wire primary 25 passing through the toroid substantially along its axis, and a secondary 26 of a large number of turns. As shown in the drawing, the primary 25 is a lead connecting the cathode of a rectifier tube to the positive load terminal but it could as well be a lead which connects a terminal of a secondary winding of transformer 14 to the anode of a rectifier tube. Insulation is provided by the air space between the primary wire 25 and the toroidal core 24, or, if desired, a bushing of ceramic material may be provided for insulating the primary lead from the core. Direct currents from source 18 are supplied to the secondary windings 26 of transformers 21, 22 and 23, respectively, through circuits comprising series resistors 34, 35 and 36, respectively, each of 56,000 ohms, one terminal of each resistor being grounded. The direct current of about 2 milliamperes flowing through the winding 26 of transformer 21, for example, causes to be set up in the core 24, a unidirectional flux for saturating the core. The core has the characteristic that the saturation point is reached very abruptly, that is, the knee of the magnetization curve is very sharp. The current in winding 26 is adjusted to bring the flux in the core to a point just above the knee of the magnetization curve. The current flowing in a normal direction from the anode to the cathode of a rectifier tube and through the primary lead 25 sets up a magnetomotive force in the core 24 which is in a direction to aid the magnetomotive force set up in the core by the direct current flowing through the secondary winding 26. However, the core is saturated due to the current in winding 26 to such an extent that the additional magnetomotive force due to the normal current in primary 25 produces no appreciable increase in flux in the core 24. Therefore, when a normal current starts to flow through a primary lead 25 due to the anode of an associated rectifier tube becoming positive with respect to its cathode, or when the current through the rectifier tube is subsequently interrupted due to a reversal of polarity of the rectifier tube electrodes, no appreciable change of flux occurs in the core 25 and no pulse of appreciable amplitude will be induced in the secondary winding 26. However, when an arc-back occurs in a rectifier tube causing it to conduct current in the reverse direction, this reverse current in the primary 25 sets up in core 24 a magnetomotive force the magnitude of which may be substantially equal to or even greater than that of the magnetomotive force set up by the current in winding 26, the two magnetomotive forces being opposed. When the amplitude of the reverse current in the primary increases to cause the flux in the core to decrease, and possibly to flow in the reverse direction an impulse of one polarity will be induced in the secondary winding 26 and when the reverse current subsequently decreases to cause the flux in the core to increase, an impulse of opposite polarity is induced in the secondary winding.

There are provided three gas-filled space current tubes 31, 32 and 33 (type 2D21), known as thyratron tubes, associated with the transformers 21, 22 and 23, respectively, each tube having an anode, an indirectly heated cathode, a screen grid and a control grid. The anodes of tubes 31, 32 and 33 are connected through the winding of a relay 37, through the armature and contact of a relay 38 and through switch 17 to the positive terminal of direct current source 18. Three voltage divider circuits are connected across the battery 18, one comprising resistors 50 and 51, a second comprising resistors 52 and 53 and the third comprising resistors 54 and 55. Resistors 50, 52 and 54 each have a resistance of 33,000 ohms and resistors 51, 53 and 55 each have a resistance of 3,900 ohms. The screen grid and cathode of tube 31 are connected to a common terminal of resistors 50 and 51, the screen grids and cathodes of tubes 32 and 33 being similarly connected to the common terminal of resistors 52 and 53 and to the common terminal of resistors 54 and 55, respectively. The common terminal of secondary transformer winding 26 and of resistor 34 is connected through a condenser 56 to the control grid of tube 31, a common terminal of the secondary winding of transformer 22 and of resistor 35 being similarly connected through a condenser 57 to the control grid of tube 32 and a common terminal of the secondary winding of transformer 23 and of resistor 36 being connected through a condenser 58 to the control grid of tube 33. The control grids of tubes 31, 32 and 33 are connected through one megohm resistors 59, 60 and 61, respectively, to ground.

Three cold cathode, gas-filled indicator tubes 41, 42 and 43 (type 359A) each having a main anode, a control electrode and a cathode, are provided for producing a visible glow in one of the tubes when current flows in the space separating its main anode and the cathode. The control electrodes of tubes 41, 42 and 43 are connected through 1 megohm resistors 44, 45 and 46, to the cathodes of tubes 31, 32 and 33, respectively. The anodes of indicator tubes 41, 42 and 43 are each connected through a switch 62 to the positive terminal of battery 18 and the cathodes of tubes 41, 42 and 43 are each connected through a common resistor 47 of 3,300 ohms to ground.

During normal operation of the rectifier, the control grids of tubes 31, 32 and 33 are each maintained at ground potential due to the paths to ground through resistors 59, 60 and 61 and the cathodes of the tubes are maintained at a potential of 12 volts positive with respect to ground due to the potential difference across each of resistors 51, 53 and 55. If an arc-back occurs in rectifier tube 11, for example, and as a result current commences to flow through primary lead 25 in a direction which is reversed with respect to the normal direction of current flow, there is induced in the secondary transformer winding 26 and impressed upon the control grid-cathode circuit of tube 31 a voltage pulse of such polarity and amplitude that current conduction is started in the space separating the anode and cathode of tube 31. As a result the anode to cathode potential drop in the tube 31 is reduced to about 8 volts and the potential of the cathode with respect to ground is increased to about 112 volts. The space current flowing in tube 31 is limited to about 25 milliamperes by the resistance of the winding of relay 37 and by the resistor 51. The potential of 112 volts at the cathode of tube 31 is applied to the control electrode of indicator tube 41 to cause conduction to be started in the space separating the control electrode and cathode. The control electrode-cathode current in tube 41 is limited to about 100 microamperes by the resistor 44. This current conduction in the control gap separating the control electrode and cathode of tube 41 causes the main gap separating the anode and cathode to conduct current and thereby produce a visible blow in tube 41 to indicate that an arc-back has occurred in rectifier tube 11. The voltage drop across the anode and cathode of tube 41, when conducting, is 70 volts and therefore the potential at the cathodes of tubes 41, 42 and 43, is increased to 50 volts. Even if one or both of tubes 32 and 33 should become conducting due to an arc-back in rectifier tube 12 or 13, or both, after tube 31 commences to conduct space current to cause the control electrode potential of tube 42 or 43, or both, to be increased to 112 volts, the potential difference between the control electrode and cathode of tube 42 or 43, or both, will be insufficient to initiate current conduction in these tubes. Therefore, one only of the indicator tubes 41, 42 and 43 becomes conducting to identify the rectifier tube in which abnormal or reverse conduction first occurred so that the rectifier tube may be replaced. To restore the indicator tube 41 to the non-conducting condition, the switch 62 may be opened, the circuit then being restored to normal by reclosing switch 62.

Current conduction in tube 31, for example, in addition to causing the energization of indicator tube 41, also causes the energization of relay 37 which operates to remove energizing current from the winding of relay 19. The resulting release of relay 19 opens the circuit for supplying alternating current from source 15 to the primary of transformer 14 of the rectifier. Power is thus quickly removed from the rectifier following the occurrence of an arc-back in a rectifier tube before the rectifier equipment can become damaged. The release of relay 19 also causes the completion of a circuit for supplying energizing current from source 18 to the winding of relay 38, the energizing current flowing through the anode-cathode path of a cold cathode tube 63, like tubes 41, 42 and 43, to ground. The tube 63 has previously been conditioned for conduction due to the voltage across the charged condenser 28 which is impressed upon the control electrode-cathode circuit of tube 63, this circuit including a series resistor 64. The operation of relay 38 opens the energizing circuit for relay 37 to thereby interrupt the current conduction in tube 31 and to again cause energizing current to be supplied to relay 19. The operation of relay 19 completes a circuit for supplying alternating current to the rectifier, opens the circuit for energizing relay 38 and completes a circuit for charging condenser 28 through series resistor 29. The starting circuit is thus restored to the condition it was in before the arc-back occurred in tube 31. Thus whenever an arc-back occurs, the source of anode voltage for the rectifier tubes will be disconnected and immediately restored provided only that condenser 28 is charged to the voltage required for causing conduction in the control electrode-cathode circuit of tube 63. The operation of relay 38 completes a discharge path for condenser 28 through a resistor 65 of 100 ohms to insure that enough time must elapse after operation of relay 37 to recharge condenser 28 in order that an automatic reclosing of the energizing circuit for the rectifier may be effected. If an arc-back should recur within a period of less than a certain minimum duration following the operation and the subsequent release of relay 19, the condenser 28 will be charged to a voltage less than that required for rendering the tube 63 conducting. In that case relay 38 will not be operated, relay 37 will therefore not release and relay 19 will fail to operate. In order to then restart the circuit it will be necessary to open and then reclose the switch 17. By making the resistance of resistor 64 greater than that of resistor 29 the discharge of condenser 28 through the control electrode-cathode circuit of tube 63 will be at a lower rate than the rate of charging condenser 28 through resistor 29 so that the tube 63 and the associated circuit will not act as a relaxation oscillator.

What is claimed is:

1. In combination with a rectifier comprising a space current rectifying device of a relay means for connecting said rectifier to an alternating current supply source when said relay means is energized, means responsive to an arc-back or reverse current flow in said rectifying device for causing the deenergization of said relay means to cause said rectifier to be disconnected from said alternating current supply source and means responsive to the deenergization of said relay means only when the preceding energization period of said relay means has been greater than a certain minimum period for causing the reenergization of said relay means to cause said supply source of alternating current to be reconnected to said rectifier.

2. In combination with a rectifier comprising a space current rectifying device of a first relay for completing a circuit for supplying current from an alternating current supply source to said rectifier when said relay is energized, a condenser and a resistor in series, said first relay when energized, completing a circuit for charging said condenser through said resistor by current from a direct current source, a second relay for interrupting the energizing circuit for said first relay when said second relay is energized, means responsive to a reverse current flow through said rectifying device for causing the energization of said second relay, a third relay for interrupting the energizing circuit of said second relay when said third relay is energized, means for completing a discharge path for said condenser in response to the operation of said third relay and means responsive jointly to the voltage across said condenser when sufficiently charged and to the release of said first relay for causing the energization of said third relay.

3. In combination, a multiphase rectifier comprising a plurality of space current rectifying devices, a circuit comprising said rectifier for supplying rectified current from an alternating current supply source to a load, a plurality of transformers each having a core of magnetic material, a primary and a secondary, said primaries being connected in series with said rectifying devices respectively, means for producing a saturating flux in each of said cores independently of the normal rectified currents flowing in said primaries, respectively, the magnetomotive force producing the saturating flux in the core of each transformer being in aiding relationship with respect to the magnetomotive force produced by the normal current flowing in the primary of the transformer, a reversed current flow in the primary of each of said transformers due to an arc-back in an associated rectifying device causing a large change of flux in the transformer core and thereby inducing a voltage in the transformer secondary, means responsive to a voltage induced in any of said secondaries for interrupting and subsequently recompleting said circuit for supplying rectified current from said source to said load and means responsive to the voltages induced in said secondaries respectively for producing an indication to identify the rectifying device in which said reverse current flow first occurred.

4. In combination, a transformer comprising a core of magnetic material forming a closed flux path, a primary and a secondary, means comprising said secondary of said transformer for setting up in said core a magnetomotive force for producing a unidirectional flux for saturating the core, a current supply circuit comprising in series a source of alternating current, a space current rectifying device and said primary, the current flowing in a normal direction through said rectifying device and said primary causing to be set up in said core a magnetomotive force which aids said first-mentioned magnetomotive force, and a voltage-controlled device responsive to voltage induced in said secondary when the direction of current flow in said primary is reversed with respect to said normal direction due to an arc-back in said rectifying device said voltage-controlled device being unresponsive to any relatively small voltage which may be induced in said secondary in response to a change of current flowing in the normal direction in said primary.

5. In combination, a transformer having a core of magnetic material, a primary and a secondary, means for setting up a magnetomotive force for producing a saturating flux in said core, a rectifier circuit for supplying rectified current from an alternating current supply source to a load comprising a space current rectifying device and said primary connected in series in said circuit, the rectified current normally flowing in said primary causing to be set up in said core a magnetomotive force which aids said steady magnetomotive force and means responsive to a change of flux in said core produced as a result of reversed current flow through said primary and said rectifying device under an abnormal condition for producing an indication of the occurrence of said abnormal condition, said last-mentioned means comprising a plurality of auxiliary space current devices having control circuits associated with said transformer secondaries respectively, said auxiliary space current devices being rendered conductive in response to voltages induced in said secondaries respectively, a plurality of indicating devices associated with said auxiliary space current devices respectively, and means for causing the energization of that indicating device only of said plurality of indicating devices which is associated with the auxiliary space current device in which conduction is first initiated.

NOEL C. OLMSTEAD.

REFERENCES CITED

The following references are of record in the file of this patent:

UNITED STATES PATENTS

| Number | Name | Date |
| --- | --- | --- |
| 373,320 | Kennedy | Feb. 21, 1888 |
| 2,001,897 | West et al. | May 21, 1935 |
| 2,008,399 | Marshall et al. | July 16, 1935 |
| 2,169,866 | Bedford | Aug. 15, 1939 |
| 2,285,556 | Batten | June 9, 1942 |

FOREIGN PATENTS

| Number | Country | Date |
| --- | --- | --- |
| 388,465 | Great Britain | Mar. 2, 1933 |